Aug. 31, 1926.
G. L. BAKER
1,598,110
PERMUTATION LOCK FOR AUTOMOBILE STEERING WHEELS
Filed June 20, 1924      5 Sheets-Sheet 1
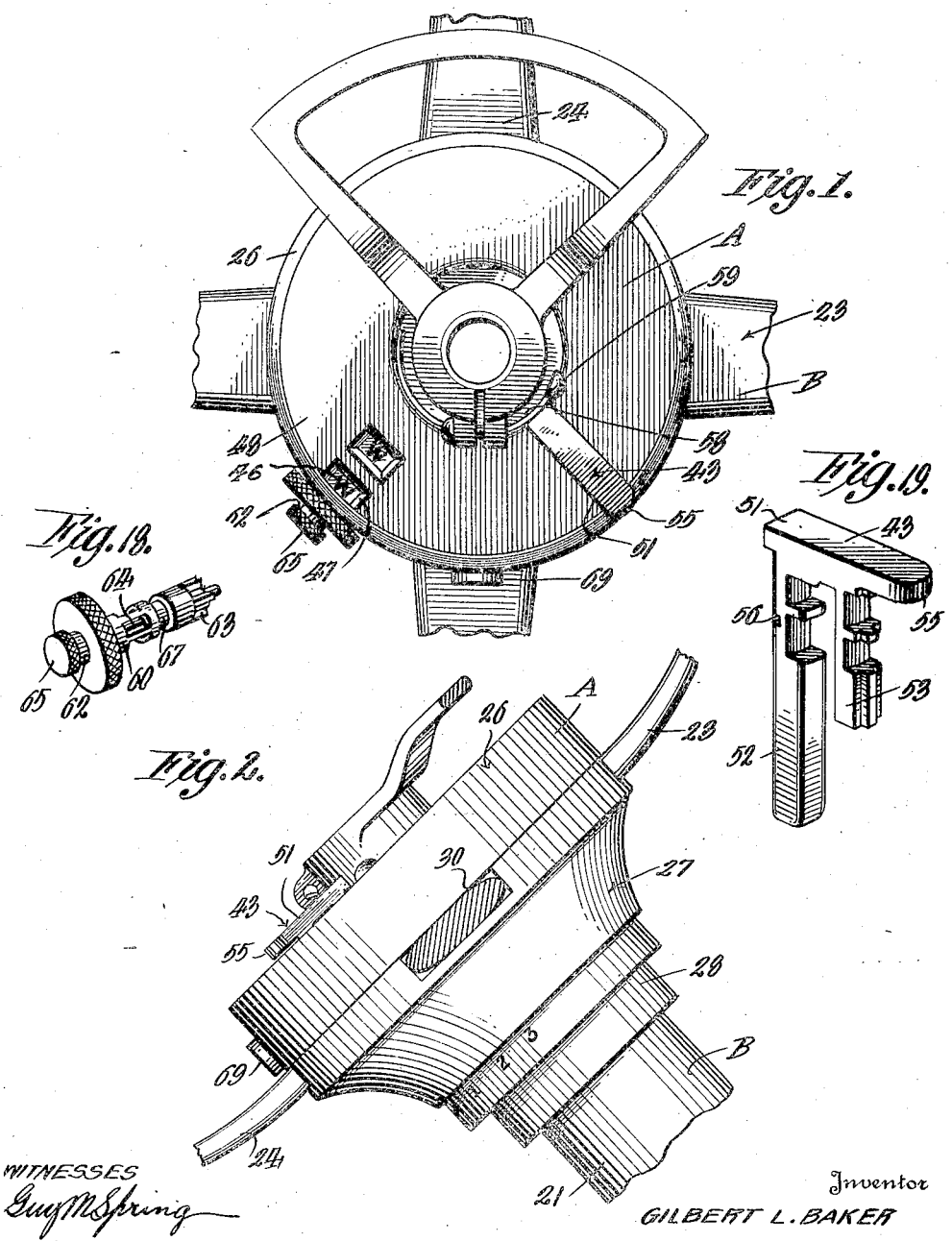
Inventor
GILBERT L. BAKER
By Richard B. Owen
Attorney Aug. 31, 1926.

G. L. BAKER 1,598,110

PERMUTATION LOCK FOR AUTOMOBILE STEERING WHEELS

Filed June 20, 1924  5 Sheets-Sheet 2

Aug. 31, 1926. 1,598,110
G. L. BAKER
PERMUTATION LOCK FOR AUTOMOBILE STEERING WHEELS
Filed June 20, 1924    5 Sheets-Sheet 3
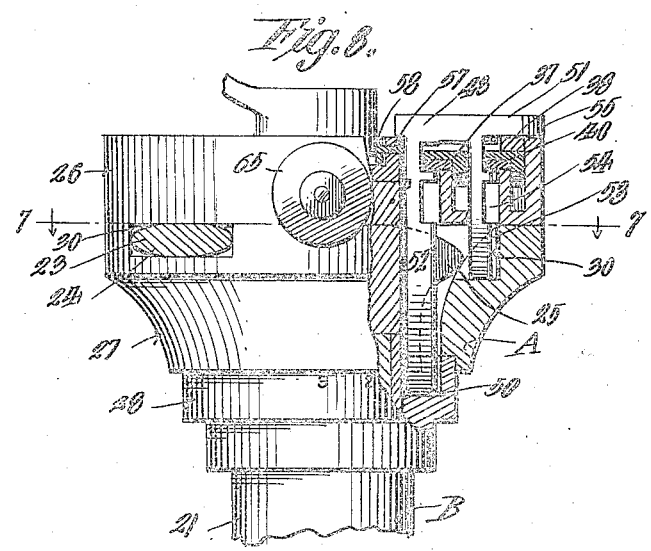
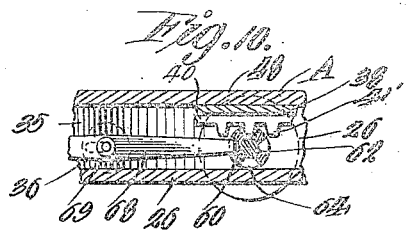
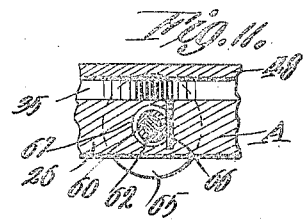
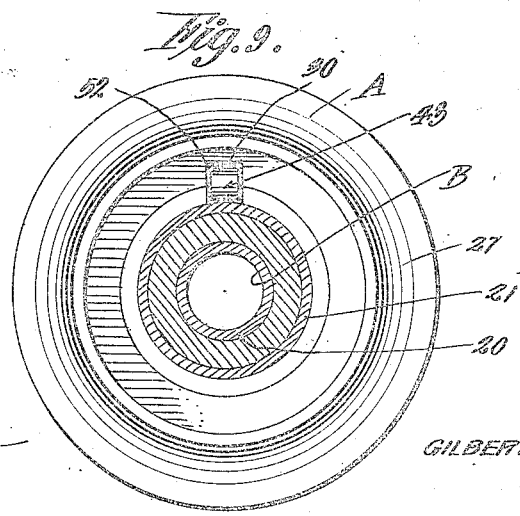
Inventor
GILBERT L. BAKER Aug. 31, 1926.
G. L. BAKER
1,598,110
PERMUTATION LOCK FOR AUTOMOBILE STEERING WHEELS
Filed June 20, 1924    5 Sheets-Sheet 4
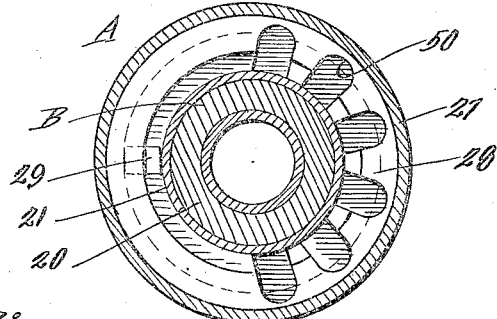
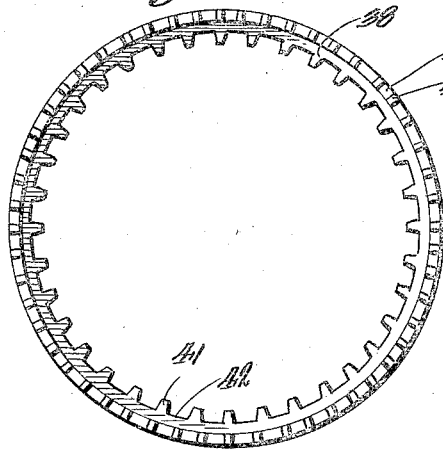
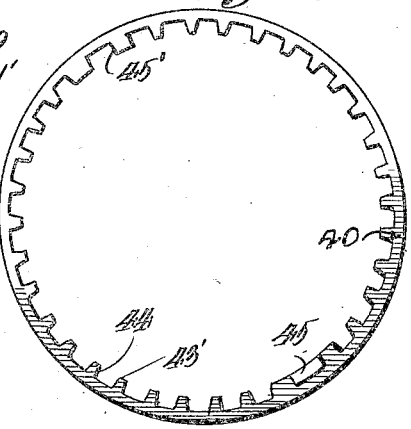
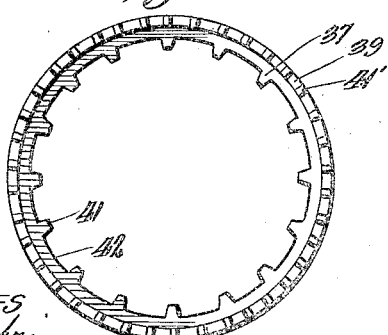
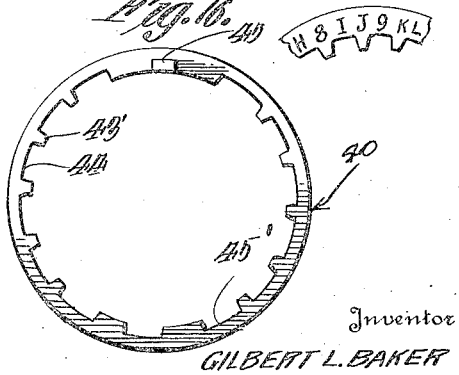
Inventor
GILBERT L. BAKER Aug. 31, 1926.

G. L. BAKER 1,598,110

PERMUTATION LOCK FOR AUTOMOBILE STEERING WHEELS

Filed June 20, 1924    5 Sheets-Sheet 5

Inventor
GILBERT L. BAKER

Patented Aug. 31, 1926.

1,598,110

UNITED STATES PATENT OFFICE.

GILBERT L. BAKER, OF OAKDALE, CALIFORNIA.

PERMUTATION LOCK FOR AUTOMOBILE STEERING WHEELS.

Application filed June 20, 1924. Serial No. 721,307.

This invention relates to automobile attachments and more particularly to permutation locks for the steering wheels of automobiles and the primary object of the invention is to provide an improved permutation lock which can be applied to the usual type of steering wheel without difficulty by the ordinary layman and which requires no cutting or changing of the steering post or wheel with the exception of a slight filing of the steering wheel hub.

Another object of the invention is to generally improve and simplify permutation locks of the type shown in my prior Patents #1,480,590 and #1,477,026, issued to me January 15, 1924; and December 11, 1923, respectively; and in my pending applications Serial Nos. 441,304 and 441,303 filed January 31, 1921.

A further object of the invention is to provide novel means for housing the rotating tumblers to protect the same from dust, dirt and the like, and novel means for constructing the tumblers and for rotating the same interiorly of the housing without necessitating the fingering thereof.

A still further object of the invention is to provide an improved permutation lock for the steering wheels of automobiles, which will be durable and efficient in use, one that will be simple and easy to manufacture, and one which can be incorporated with the steering wheel post of an automobile at a small cost.

With these and other objects in view, the invention consists in the novel construction, arrangement and formation of parts, as will be hereinafter more specifically described, claimed, and illustrated in the accompanying drawings, in which drawings:

Figure 1 is a plan view of the improved lock showing the same applied to a steering wheel and post, parts of the steering wheel being broken away, Figure 2 is a side elevation of the improved lock incorporated with the steering wheel and post, parts of the steering wheel being broken away and in section, Figure 3 is a plan view of the improved lock incorporated with a steering wheel with the cap or cover plate removed showing the improved rotating tumblers, the locking bolt being shown in section, Figure 4 is a longitudinal section through the lock and steering wheel and post taken on the line 4—4 of Figure 3, showing the cap or closure plate and bolt in position, Figure 5 is an elevation of the lock showing parts thereof broken away to illustrate the novel means employed for rotating the tumblers, Figure 6 is a top plan view of the lock with the cap or cover plate and the tumblers removed, the locking bolt being shown in section, the view illustrating the lock or catch for holding the operating means of the tumblers against movement, Figure 7 is a section taken on the line 7—7 of Figure 8 showing the base portion of the casing in plan, Figure 8 is an elevation partly in section showing the locking bolt in position and the tumblers in engagement therewith, Figure 9 is a section taken on the line 9—9 of Figure 4 looking in the direction of the arrows, the base of the housing or casing being shown in bottom plan, Figure 10 is a detailed section taken on the line 10—10 of Figure 6 showing the operating means engaging the outer tumbler and the lock or catch for said operating means, Figure 11 is a detailed section taken on the line 11—11 of Figure 6 illustrating the means for holding the operating device for the tumblers in position against displacement, Figure 12 is a section taken on the line 12—12 of Figure 4 showing the base secured to the casing or shell of the steering column and in plan illustrating the lock notches formed therein for receiving the locking bolt whereby the steering wheels can be locked at different angles relative to the body of the automobile, Figure 13 is a bottom plan view of the outer rotating tumbler, Figure 14 is a top plan view of the outer adjusting ring carried by the outer tumbler, Figure 15 is a bottom plan view of the inner rotating tumbler, Figure 16 is a top plan view of the adjusting ring carried by the inner rotating tumbler, Figure 17 is a fragmentary top plan view showing a modified type of rotating tumbler, Figure 18 is a detailed perspective view of the operating means for the tumblers, and Figure 19 is a detailed perspective view of the locking bolt.

Referring to the drawings in detail, wherein similar reference characters designate corresponding parts throughout the several views, the letter A generally indicates the improved steering wheel lock and B the steering assembly with which the same can be incorporated. The steering assembly B is of the usual character and comprises the steering wheel shaft or post 20 rotatably mounted in the steering casing or shell 21. The upper end of the post 20 has secured thereto in any desired way the hub 22 of the steering wheel 23 which also includes the radially extending steering arms or spokes 24. As shown the hub 22 of the steering wheel 23 is provided with a longitudinally extending slot or notch 25 for the reception of a bolt, as will be hereinafter more fully described. The forming of the notch or slot 25 in the steeering wheel hub 22 is the only change necessary in the usual type of steering assembly and this slot or notch can be easily formed by a file or the like by the ordinary layman.

The improved permutation lock comprises an upper housing section 26 of substantially circular shape, a lower annular base section 27 and a base ring 28 which is rigidly connected with the steering casing or shell 21 by any preferred means such as a key 29. The shell or casing 21 is of course secured to the floor or the body of the automobile in the usual way and thus the base ring 28 is normally held from rotating, while the upper casing or housing section 26 and the lower base section 27 rotate with the steering wheel and the upper face of the base section 27 is provided with radially extending notches 30 for the reception of arms or spokes 24 of the steering wheel 23. As clearly shown in Figures 2, 4 and 8 the upper housing or casing section 26 sets down on the hub of the steering wheel and in intimate contact with the upper surface of the base section 27 and can be rigidly secured to the hub in any desired way such as by keys or screws. The lower base section 27 can also be secured to the hub as indicated by the reference character 27′. At this point it is well to note that the lower base section 27 is provided with a notch 31 which is in radial alignment with the notch 25 in the hub for the reception of the locking bolt and the upper casing or housing section 26 is provided with vertically extending guide openings 32 and 33 for the reception of the bolt also.

The upper housing or casing 26 is in the nature of a solid circular block and is provided with an axially disposed opening for the reception of the post or shaft 20 and the upper outer face of the same is provided with inner and outer concentrically disposed annular grooves or channels 34 and 35. These channels have the lower walls thereof provided with relatively deep grooves 36 for a purpose, which will be hereinafter more fully described. The channels 34 and 35 receive respectively the inner and outer annular tumblers 37 and 38 and these tumblers are adapted to rotate in the channels. Each tumbler is provided on one side with an annular rim 39 within which is seated an adjusting ring 40. As shown the adjusting ring 40 rests on the lower wall of its respective channel while the rim 39 projects into the deep portion 36 of the channel and is provided with gear teeth 41′ providing a crown gear for a purpose, which will be hereinafter more fully described. By adjusting the ring 40 any desired combination may be set up, as will be hereinafter more fully described. Each tumbler is provided with a series of equally spaced teeth 41 projecting inwardly and separated by notches 42 each of which are of a sufficient size to receive the bolt 43, which will be hereinafter more fully described. The adjusting ring 40 is provided with inwardly extending teeth 43′ defining notches 44 therebetween. An upstanding lug 45 is formed on each adjusting ring and is adapted to fit between any one of the teeth 41 on the tumbler and the adjusting ring is provided at a point diametrically opposite the lug with a notch 45′ which is adapted to register with one of the notches 42 in the tumbler so as to permit the passage of the bolt into the housing 26 base section 27 and base ring 28, as will be hereinafter more fully described. It is obvious that by placing the lug 45 in different notches 42 that the combination of the lock can be changed. Suitable numerals and letters 46 can be stamped upon the upper face of each of the tumblers and these numbers or letters are adapted to appear one at a time through suitable windows or sight openings 47 formed in the cap or cover plate 48 which is adapted to cover the said tumblers. As shown this cap or cover plate 48 is provided with an internally threaded axially disposed opening for permitting the same to be threaded on the shaft or post 20. The windows or openings 47 form in connection with the numerals and letters on the tumblers means to permit the determining of the position in which the tumblers are to be set for unlocking the bolt 43.

In Figure 17 I have shown a slightly modified form of tumbler in which a greater number of numerals and letters is used, the teeth and notches being both marked, which will render the lock more difficult to operate by unauthorized persons not knowing the combination thereof. The base ring 28 which is secured rigidly to the casing or shell 21 is provided on its upper face with a plurality of notches 50 for the reception of the lower end of the bolt 43 and by means of these notches 50 the steering wheel can be locked in different positions so that the steering wheels can be held in different angles relative to the body of the automobile.

The locking bolt 43 comprises a head 51 and depending legs 52 and 53. The leg 52 is formed relatively longer than the leg 53 and is adapted to be received in any one of the notches 50 of the base ring 28 when the bolt is inserted in the lock to its full locking position. Each leg is provided with upper and lower sets of notches 54 for the reception of the locking tumblers and these upper and lower sets of notches permit the bolt to be locked in its lowered position for holding the steering wheel against movement and in its raised position for permitting the turning of the steering wheel. The head 51 is provided with a finger piece 55 for permitting the convenient operation thereof. One side of the leg 52 which is opposite to the side provided with the upper and lower notches is provided with a notch 56 which is adapted to receive a pin 57 when the bolt is in its raised unlocking position to prevent falling of the bolt. This pin 57 is carried by a leaf spring 58 which is carried by the cover plate or cap 48. As shown the pin is adapted to extend through an opening formed in the cap and the spring is provided with a thumb piece 59 for permitting the flexing of the spring and the withdrawing of the pin from the notch. Now it is obvious from the foregoing, that when the correct combination is set up and the combination tumblers are arranged so that the spaces 42 and the notches 44 of the adjusting ring are in alignment with the openings or notches formed in the cap or cover plate, upper housing or casing section 26 and the lower base section 27 that the bolt 43 can be placed in position. Now when the tumblers are rotated and the teeth ride into the notches formed in the bolt it can be seen that the bolt cannot be withdrawn. The lower end of the bolt is adapted to fit in any one of the notches 50 so that the steering wheel cannot be rotated. The outer face of the base ring 28 is preferably marked to indicate the different notches 50, so as to indicate when the bolt is over one of the notches and by moving the steering wheel and then inserting the leg 52 into the desired notch the wheels can be locked in the desired angular position.

The novel means employed for rotating the tumblers comprises a hollow shaft 60, which is rotatably mounted within suitable bearing openings 61 formed in the casing or housing section 26, and an inner solid shaft 62 which is rotatably mounted within the hollow shaft. The inner end of the solid shaft 62 is provided with a pinion 63 for engaging the teeth formed on the rim 39 of the inner tumbler. The hollow shaft 60 is provided with equidistant spaced notches for receiving the gear teeth formed on the outer tumbler. Now it can be seen that by rotating the shafts that the tumblers can be readily rotated and it is to be noted that the pinion 63 is disposed in the relatively deep portion 36 of the inner channel 34 while the notched portion 64 of the hollow shaft is positioned in the relatively deep portion of the outer channel 35. The shafts are provided with manipulating thumb pieces 65. The shafts are held against displacement by means of a suitable pin 66 which is inserted in the housing or casing 26 into a suitable annular groove 67 formed in the outer face of the hollow shaft.

In order to lock the hollow outer shaft against rotation, a sliding leaf 68 is carried by the casing or housing section 26 and is fitted against the outer wall of the outer channel 35. This leaf is provided with a pointed terminal which is adapted to fit in any one of the teeth receiving notches 64 of the outer shaft. The leaf can be readily manipulated by means of a thumb or finger piece 69 which extends through the outer wall of the housing or casing section 26.

In the drawings the combination is shown to be W—W and thus by rotating the finger pieces 65 the combination can be readily set up which will permit the insertion or the withdrawing of the locking bolt as desired. After the locking bolt has been inserted the tumblers can be rotated by the finger pieces which will lock the bolt in place and thus effectively prevent the steering of the machine.

Changes in details may be made without departing from the spirit or the scope of this invention, but:

What I claim as new is:

1. A permutation lock for the steering wheel assembly of an automobile comprising a housing rotatable with and secured to the steering wheel, the housing, wheel and a fixed part of the assembly having openings therein arranged to align when the steering wheel is in a predetermined position, a bolt for fitting in the openings for holding the steering wheel against rotation, a plurality of permutation tumblers rotatably mounted in and protected by the housing for engaging the bolt, gear teeth formed on the tumblers, pinions for engaging the gear teeth, and means for operating the pinions, from the exterior of the housing for permitting the desired combination to be set up.

2. A permutation lock for the steering wheel assembly of an automobile comprising a housing rotatable with and secured to the steering wheel, the housing, wheel and a fixed part of the assembly having openings therein arranged to align when the steering wheel is in a predetermined position, a bolt for fitting in the openings for holding the steering wheel against rotation, the housing having a plurality of annular channels formed therein, the openings in the housing extending through the channels, a plurality of annular tumblers rotatably mounted in the channels for cooperating with the bolt, the tumblers being provided with suitable indicia, the housing having sight openings therein through which the indicia is adapted to appear, depending crown gears formed on the tumblers, the housing being provided with a radially extending opening bisecting the channel ways, a hollow shaft rotatably mounted in the last mentioned opening, a solid shaft rotatably mounted in the hollow shaft, means carried by the solid and hollow shafts for engaging the crown gears, and manipulating knobs secured to the shafts and arranged exteriorly of the housing to permit of the rotation of the tumblers whereby the desired combination can be set up.

3. A permutation lock for the steering wheel assembly of an automobile comprising a housing rotatable with and secured to the steering wheel, the housing, wheel and a fixed part of the assembly having openings therein arranged to align when the steering wheel is in a predetermined position, a bolt for fitting in the openings for holding the steering wheel against rotation, the housing having a plurality of annular channels formed therein, the openings in the housing extending through the channels, a plurality of annular tumblers rotatably mounted in the channels for cooperating with the bolt, the tumblers being provided with suitable indicia, the housing having sight openings therein through which the indicia is adapted to appear, depending crown gears formed on the tumblers, the housing being provided with a radially extending opening bisecting the channel ways, a hollow shaft rotatably mounted in the last mentioned opening, a solid shaft rotatably mounted in the hollow shaft, means carried by the solid and hollow shafts for engaging the crown gears, manipulating knobs secured to the shafts and arranged exteriorly of the housing to permit of the rotation of the tumblers whereby the desired combination can be set up, and releasable means for engaging one of the shafts to prevent rotation thereof.

4. A permutation lock for the steering wheel assembly of an automobile comprising a housing rotatable with and secured to the steering wheel, the housing, wheel and a fixed part of the assembly having openings therein arranged to align when the steering wheel is in a predetermined position, a bolt for fitting in the openings for holding the steering wheel against rotation, a plurality of rotatable tumblers rotatable in and protected by the housing for cooperation with the bolt, the tumblers permitting the releasing of the bolt when the same are in a predetermined position, crown gears formed on the tumblers, a hollow shaft rotatably carried by the housing, a solid shaft rotatably mounted in the hollow shaft, means carried by the shafts for engaging the crown gears to bring about the rotation thereof during manipulation of the shaft, manipulating knobs secured to the shafts and arranged exteriorly of the housing to permit of the turning of the shafts, a sliding leaf arranged interiorly of the housing adapted to engage one of the shafts for preventing rotation thereof, and a finger piece secured to the leaf for permitting the leaf to be moved to different positions, as and for the purpose specified.

5. A permutation lock for the steering wheel assembly of an automobile comprising a housing rotatable with and secured to the steering wheel, the housing, wheel and a fixed part of the assembly having openings therein arranged to align when the steering wheel is in a predetermined position, a locking bolt including a manipulating head and spaced parallel disposed legs having notches therein, a plurality of concentric permutation tumblers rotatably mounted in the housing and disposed in the same plane adapted to engage the walls of the notches in the bolt, the tumblers being adapted to release the bolt when the same are in a predetermined position, and means for rotating the tumblers.

6. A permutation lock for the steering wheel assembly of an automobile comprising a housing rotatable with and secured to the steering wheel, the housing, wheel and a fixed part of the assembly having openings therein arranged to align when the steering wheel is in a predetermined position, a bolt including a manipulating head and depending legs for fitting in the openings, the legs having an upper and lower set of notches, a plurality of rotatable annular tumblers mounted within the housing adapted to engage in one set of notches in the bolt for holding the bolt in a locked position and in the other set of notches for holding the bolt in its unlocked position, the tumblers being concentric arranged and in the same horizontal plane, and means for rotating the tumblers.

7. A permutation lock for the steering wheel assembly of an automobile comprising a housing rotatable with and secured to the steering wheel, the housing, wheel and a fixed part of the assembly having openings therein arranged to align when the steering wheel is in a predetermined position, a bolt including a manipulating head and spaced parallel legs for fitting in the openings when the steering wheel is in a predetermined position, the legs of the locking bolt having notches therein, concentric rotatable annular tumblers disposed in the housing one within the other in the same plane for engaging in the notches when the bolt is in a predetermined position, the tumblers permitting the releasing of the bolt when the same are arranged in a predetermined position, means for rotating the tumblers, and an independent catch for engaging the bolt when the same is in a raised unlocked position for preventing the accidental displacement thereof.

8. The combination with a steering wheel assembly including a steering shaft, a hollow casing for receiving the shaft, and a steering wheel secured to the shaft, of a permutation lock for the steering wheel comprising an upper housing section fitted on the steering wheel in engagement with the hub and post thereof, a base ring secured to the steering shaft casing, a base section rotatably mounted on the base ring having a plurality of notches therein for snugly receiving the spokes and hub of the steering wheel, the base section and housing section being disposed in abutting relation, the housing section, base section and base ring being provided with openings adapted to align when the steering wheel is in a predetermined position, a bolt adapted to fit in the opening to lock the steering wheel against rotation, a plurality of permutation tumblers arranged in the same plane disposed in the housing section for engaging the bolt for holding the bolt against movement, the tumblers being adapted to release the bolt when in a predetermined position, and means for rotating the tumblers.

9. The combination with the steering wheel assembly of an automobile including a steering shaft, a casing for the shaft and a steering wheel secured to the shaft, of a permutation lock for holding the steering wheel against movement by unauthorized persons including a housing section secured to the shaft and fitted against the hub and spokes of the steering wheel the said section having a plurality of annular channels therein, a plurality of concentric rotatable tumblers fitted in the channels having combination indicia thereon, a cap plate for the section enclosing the tumblers having sight openings therein for permitting the desired combination to be set up, means for rotating the tumblers exteriorly of said section, a base section disposed in abutting relation with the lower face of the housing section having radial notches therein for receiving the spokes of the steering wheel, a base ring rigidly secured to the casing of the steering shaft rotatably receiving the base section and having a plurality of spaced pockets in its upper face, indicia on the outer face of the base ring designating the location of the pockets, the housing section, the hub of the steering wheel and the base section being provided respectively with openings and slots for aligning with any one of the pockets in the base ring when the steering wheel is in a predetermined position, a lock bolt for fitting in the openings and the slots for holding the steering wheel against rotation, means carried by the tumblers for engaging the bolts to prevent removal thereof by unauthorized persons from the lock, the tumblers permitting the withdrawing of the bolt when the same are arranged in a predetermined position.

10. A permutation lock for the steering wheel assembly of an automobile comprising a housing rotatable with and secured to the steering wheel, the housing, wheel and a fixed part of the assembly having openings therein arranged to align when the steering wheel is in a predetermined position, a bolt for fitting in the openings for holding the steering wheel aginst rotation, the bolt having notches therein, and a plurality of annular tumblers rotatably mounted in the housing including a plurality of inwardly extending teeth defining spaced notches, adjusting rings adjustably carried by each tumbler including teeth for fitting between the teeth of the tumblers, the teeth of the tumblers and adjusting rings being adapted to engage the walls of the notches of the lock bolt, one of the spaces of the adjusting ring being adapted to align with one of the spaces of the teeth of the tumblers whereby when said aligned spaces are in a predetermined positon relative to the bolt the same can be withdrawn, and means for rotating the tumblers.

In testimony whereof I affix my signature.

GILBERT L. BAKER.